United States Patent
Mallesan et al.

(10) Patent No.: US 7,865,612 B2
(45) Date of Patent: *Jan. 4, 2011

(54) METHOD AND APPARATUS FOR PARTITIONING RESOURCES WITHIN A SESSION-OVER-INTERNET-PROTOCOL (SOIP) SESSION CONTROLLER

(75) Inventors: Saravanan Mallesan, Fairfax, VA (US); Rohini Raman, Germantown, MD (US)

(73) Assignee: Genband US LLC, Plano, TX (US)

( * ) Notice: Subject to any disclaimer, the term of this patent is extended or adjusted under 35 U.S.C. 154(b) by 966 days.

This patent is subject to a terminal disclaimer.

(21) Appl. No.: 11/343,211

(22) Filed: Jan. 31, 2006

(65) Prior Publication Data

US 2007/0180080 A1    Aug. 2, 2007

(51) Int. Cl.
*G06F 15/173* (2006.01)
(52) U.S. Cl. ................. 709/239; 709/238; 709/227
(58) Field of Classification Search ................. 709/223, 709/227, 238, 239
See application file for complete search history.

(56) References Cited

U.S. PATENT DOCUMENTS

| | | | |
|---|---|---|---|
| 5,796,424 A | 8/1998 | Ely et al. | |
| 6,738,813 B1 | 5/2004 | Reichman | |
| 6,775,269 B1 | 8/2004 | Kaczmarczyk et al. | |
| 6,775,280 B1 | 8/2004 | Ma et al. | |
| 6,895,429 B2 | 5/2005 | Banga et al. | |
| 6,904,017 B1 | 6/2005 | Meempat et al. | |
| 6,944,678 B2 | 9/2005 | Lu et al. | |
| 6,980,526 B2 | 12/2005 | Jang et al. | |
| 7,002,973 B2 | 2/2006 | MeLampy et al. | |
| 7,028,092 B2 | 4/2006 | MeLampy et al. | |
| 7,031,311 B2 | 4/2006 | MeLampy et al. | |

(Continued)

FOREIGN PATENT DOCUMENTS

EP        1043648 A2 * 10/2000

(Continued)

OTHER PUBLICATIONS

Liu et al., WSIP—Web Service SIP Endpoint for Converged Multimedia/Multimodal Communication over IP., Avaya Labs Research., Basking Ridge, NJ, USA. Web Services, 2004. Proceedings. IEEE International Conference, Jul. 6-9, 2004.*

(Continued)

*Primary Examiner*—Wing F Chan
*Assistant Examiner*—Kostas Katsikis
(74) *Attorney, Agent, or Firm*—Jenkins, Wilson, Taylor & Hunt, P.A.

(57) ABSTRACT

A method and apparatus for partitioning resources within a Session-over-Internet-Protocol (SoIP) Session Controller (SC) are described. In one illustrative embodiment, an apparatus comprises data access logic configured to receive an instruction to define at least one virtual partition in a SoIP SC, grant a primary entity access to data associated with each virtual partition, and grant each secondary entity from a plurality of secondary entities exclusive access, relative to the remaining secondary entities from the plurality of secondary entities, to data associated with a virtual partition associated with that secondary entity; and session administration logic configured to generate, for each SoIP session traversing a given virtual partition, a session data record (SDR) uniquely associated with that given virtual partition.

14 Claims, 9 Drawing Sheets

U.S. PATENT DOCUMENTS

| | | | |
|---|---|---|---|
| 7,072,303 B2 | 7/2006 | MeLampy et al. | |
| 7,133,923 B2 | 11/2006 | MeLampy et al. | |
| 7,142,532 B2 | 11/2006 | Penfield et al. | |
| 7,151,781 B2 | 12/2006 | MeLampy et al. | |
| 7,193,996 B2 | 3/2007 | Dobbins et al. | |
| 7,260,085 B2 | 8/2007 | Dobbins et al. | |
| 7,362,707 B2 | 4/2008 | MeLampy et al. | |
| 7,376,731 B2 | 5/2008 | Khan et al. | |
| 7,433,315 B2 | 10/2008 | Bhatia et al. | |
| 7,447,160 B1* | 11/2008 | Croak et al. | 370/242 |
| 7,466,710 B1* | 12/2008 | Clemm et al. | 370/401 |
| 7,483,380 B2 | 1/2009 | Metke | |
| 2001/0033551 A1 | 10/2001 | Busuioc et al. | |
| 2002/0024954 A1* | 2/2002 | Cunetto et al. | 370/395.2 |
| 2002/0087689 A1* | 7/2002 | Chen | 709/225 |
| 2002/0087721 A1 | 7/2002 | Sato et al. | |
| 2003/0005152 A1 | 1/2003 | Diwan et al. | |
| 2003/0072271 A1 | 4/2003 | Simmons et al. | |
| 2003/0161310 A1 | 8/2003 | Dobbins et al. | |
| 2003/0186702 A1* | 10/2003 | McConnell et al. | 455/450 |
| 2003/0225893 A1* | 12/2003 | Roese et al. | 709/227 |
| 2004/0015583 A1 | 1/2004 | Barrett et al. | |
| 2004/0025186 A1 | 2/2004 | Jennings et al. | |
| 2004/0044871 A1* | 3/2004 | Weber et al. | 711/173 |
| 2004/0066782 A1* | 4/2004 | Nassar | 370/389 |
| 2004/0086093 A1 | 5/2004 | Schranz | |
| 2004/0109541 A1* | 6/2004 | Celi et al. | 379/88.13 |
| 2004/0117624 A1 | 6/2004 | Brandt et al. | |
| 2004/0128201 A1 | 7/2004 | Ofir et al. | |
| 2004/0213210 A1* | 10/2004 | Dube et al. | 370/352 |
| 2004/0218614 A1 | 11/2004 | Yokomitsu et al. | |
| 2004/0250114 A1 | 12/2004 | Parekh et al. | |
| 2005/0111382 A1 | 5/2005 | Le et al. | |
| 2005/0111455 A1 | 5/2005 | Nozue et al. | |
| 2005/0147031 A1 | 7/2005 | Bhatia et al. | |
| 2005/0213591 A1 | 9/2005 | Nakazawa et al. | |
| 2005/0265231 A1 | 12/2005 | Gunther et al. | |
| 2006/0088025 A1* | 4/2006 | Barkley et al. | 370/352 |
| 2006/0098577 A1 | 5/2006 | MeLampy et al. | |
| 2006/0126664 A1 | 6/2006 | Horton | |
| 2006/0147013 A1* | 7/2006 | Baumeister et al. | 379/210.01 |
| 2006/0187927 A1 | 8/2006 | MeLampy et al. | |
| 2006/0187942 A1 | 8/2006 | Mizutani et al. | |
| 2006/0215683 A1 | 9/2006 | Sukkar et al. | |
| 2006/0245574 A1 | 11/2006 | Phelps et al. | |
| 2007/0019619 A1 | 1/2007 | Foster et al. | |
| 2007/0036151 A1 | 2/2007 | Baeder | |
| 2007/0058639 A1 | 3/2007 | Khan | |
| 2007/0076591 A1 | 4/2007 | Khan | |
| 2007/0076594 A1 | 4/2007 | Khan et al. | |
| 2007/0076603 A1 | 4/2007 | MeLampy et al. | |
| 2007/0076710 A1 | 4/2007 | Khan | |
| 2007/0076855 A1 | 4/2007 | MeLampy et al. | |
| 2007/0104105 A1 | 5/2007 | MeLampy et al. | |
| 2007/0116043 A1 | 5/2007 | MeLampy et al. | |
| 2007/0180124 A1 | 8/2007 | Mallesan et al. | |
| 2007/0180141 A1 | 8/2007 | Mallesan | |
| 2007/0180142 A1 | 8/2007 | Small et al. | |
| 2007/0201472 A1 | 8/2007 | Bhatia et al. | |
| 2007/0201473 A1 | 8/2007 | Bhatia et al. | |
| 2007/0201481 A1 | 8/2007 | Bhatia et al. | |
| 2007/0201494 A1 | 8/2007 | Lou et al. | |
| 2007/0263660 A1 | 11/2007 | Mitsumori | |
| 2008/0101343 A1 | 5/2008 | Monette et al. | |
| 2008/0159294 A1 | 7/2008 | Irish et al. | |
| 2008/0285569 A1 | 11/2008 | Stademann et al. | |
| 2009/0046720 A1 | 2/2009 | Streijl et al. | |
| 2009/0086728 A1 | 4/2009 | Gulati et al. | |

FOREIGN PATENT DOCUMENTS

| | | |
|---|---|---|
| JP | 2004193845 A | 7/2004 |
| WO | WO 02/49279 A2 | 6/2002 |
| WO | WO 02/49315 A2 | 6/2002 |
| WO | WO 02/49316 A2 | 6/2002 |
| WO | WO 02/58349 A1 | 7/2002 |
| WO | WO 02060116 A2 * | 8/2002 |

OTHER PUBLICATIONS

Official Action for U.S. Appl. No. 11/343,218 (Mar. 18, 2009).
Official Action for U.S. Appl. No. 11/343,212 (Mar. 13, 2009).
"Session Border Controller," http://www.yenra.com-session-border-controller/, p. 1 (Oct. 18, 2004).
Hayes, "IP Based Multimedia Services Platform," Ericsson, ITU-T IMT-2000 and Beyond, pp. 1-19 (May 28, 2002).
Smiljanić, "Flexible Bandwidth Allocation in High-Capacity Packet Switches," IEEE/ACM Transactions on Networking, vol. 10, No. 2, pp. 287-293 (Apr. 2002).
"Session Admission Control: Interactive Communication SLAs over Skinny Pipes," Acme Packet, Inc., pp. 1-14 (Copyright 2002).
Interview Summary for U.S. Appl. No. 11/343,212 (Aug. 3, 2010).
Interview Summary for U.S. Appl. No. 11/864,206 (Jul. 6, 2010).
Final Office Action for U.S. Appl. No. 11/864,206 (May 28, 2010).
Official Action for U.S. Appl. No. 11/343,212 (Apr. 28, 2010).
Interview Summary for U.S. Appl. No. 11/537,329 (Mar. 1, 2010).
Interview Summary for U.S. Appl. No. 11/537,345 (Feb. 5, 2010).
Interview Summary for U.S. Appl. No. 11/343,212 (Jan. 26, 2010).
Final Official Action for U.S. Appl. No. 11/343,212 (Dec. 18, 2009).
Final Official Action for U.S. Appl. No. 11/864,206 (Dec. 11, 2009).
Final Official Action for U.S. Appl. No. 11/343,218 (Nov. 13, 2009).
Official Action for U.S. Appl. No. 11/537,345 (Nov. 3, 2009).
Interview Summary for U.S. Appl. No. 11/343,212 (Oct. 1, 2009).
Official Action U.S. Appl. No. 11/537,316 (Sep. 25, 2009).
Official Action for U.S. Appl. No. 11/537,329 (Sep. 18, 2009).
Non-Final Official Action for U.S. Appl. No. 11/864,206 (Jul. 23, 2009).
Interview Summary for U.S. Appl. No. 11/343,218 (Jul. 22, 2009).
Notification of Transmittal of the International Search Report and the Written Opinion of the International Searching Authority, or the Declaration for International Application No. PCT/US2008/077987 (Jul. 14, 2009).
Official Action for U.S. Appl. No. 11/537,345 (Mar. 4, 2009).
Official Action for U.S. Appl. No. 11/537,329 (Feb. 20, 2009).
Official Action for U.S. Appl. No. 11/537,316 (Feb. 20, 2009).
Tyson et al., "How VoIP Works," Dockitmoto, http://computer.howstuffworks.com/ip-telephony.htm/printable (Downloaded from the Internet on Jan. 19, 2006).
"NexTone Products," http://www.nextone.com/pages/products/product.htm, (Copyright 2005) (Downloaded from the Internet on Jan. 19, 2006).
Notice of Allowance for U.S. Appl. No. 11/864,206 (Nov. 12, 2010).
Notice of Allowance and Fee(s) Due for U.S. Appl. No. 11/343,218 (Sep. 8, 2010).
Notice of Allowance and Fee(s) Due for U.S. Appl. No. 11/343,212 (Sep. 7, 2010).

* cited by examiner

METHOD AND APPARATUS FOR PARTITIONING RESOURCES WITHIN A SESSION-OVER-INTERNET-PROTOCOL (SOIP) SESSION CONTROLLER

RELATED APPLICATIONS

This application is related to the following commonly owned and assigned applications: application Ser. No. 11/343,212, "Adaptive Feedback for Session Over Internet Protocol," filed herewith; and application Ser. No. 11/343, 218, "Session Data Records and Related Alarming within a Session Over Internet Protocol (SoIP) Network," filed herewith; each of which is incorporated herein by reference in its entirety.

FIELD OF THE INVENTION

The invention relates generally to Session-over-Internet-Protocol (SoIP) networks. More specifically, but without limitation, the invention relates to methods and apparatuses for partitioning resources within a SoIP session controller (SC).

BACKGROUND OF THE INVENTION

Voice telecommunication has traditionally been conducted via dedicated telephone networks using telephone switching offices and either wired or wireless connections for transmitting the voice signal between users' telephones. Such telecommunications, which use the Public Switched Telephone Network (PSTN), may be referred to as circuit-switched communications. Because of the circuit-based nature of the PSTN, modifying a connection by setting up circuits and implementing routing changes can be a relatively slow process that often requires manual intervention. If considered in the context of the Open System Interconnection (OSI) model, PSTN modifications generally occur on layers one, two, and three. Another disadvantage of the PSTN is that, despite most conversations including significant intervals of silence, each call requires a dedicated point-to-point circuit throughout its duration, resulting in inefficient use of network bandwidth.

Session-over-Internet-Protocol (SoIP) provides an alternative telecommunication architecture using discrete internet-protocol (IP) packets of digitized data to transmit media content over the Internet or within an intranet via wired and/or wireless connections. One type of SoIP technology, Voice-over-Internet-Protocol (VoIP), is becoming increasingly popular. VoIP technology provides an alternative to the PSTN for voice communications. SoIP technology can transmit other forms of multimedia communication such as video voice content, video content and/or data. Because SoIP technology is based on IP packet switching, SoIP connections and routes can be defined and managed quickly. Also, because SoIP does not require a dedicated circuit between endpoints throughout a session (e.g., a voice call), SoIP technology makes more efficient use of network bandwidth.

A Session Controller (SC) and/or its related functionality is a part of a SoIP network. When a SC is located at the border of a network (e.g., where the SoIP network connects with another network such as a private enterprise network), it is typically called a Session Border Controller (SBC). A SC or SBC facilitates the flow of two-way SoIP traffic between different parts of a network or between different networks. Without a SC or SBC, network "firewalls" may interfere with the flow of SoIP traffic.

In many situations, it is economically advantageous to subdivide large resources so that the subdivided resources can be sold or leased to separate customers. Known SoIP SCs, however, do not provide for such a subdivision of their session-capacity resources.

SUMMARY OF THE INVENTION

In some embodiments, methods and apparatuses partition resources within a Session-over-Internet-Protocol (SoIP) Session Controller (SC). One illustrative embodiment is a method comprising selling a block of SoIP session capacity associated with a SoIP SC to a first customer, a session capacity for a virtual partition from a plurality of virtual partitions and from the block of SoIP session capacity being resold by the first customer to a second customer after the selling, each virtual partition from the plurality of virtual partitions being mutually exclusive from the remaining virtual partitions from the plurality of virtual partitions.

Another illustrative embodiment is an apparatus comprising data access logic configured to receive an instruction to define at least one virtual partition in a SoIP SC, grant a primary entity access to data associated with each virtual partition, and grant each secondary entity from a plurality of secondary entities exclusive access, relative to the remaining secondary entities from the plurality of secondary entities, to data associated with a virtual partition associated with that secondary entity; and session administration logic configured to generate, for each SoIP session traversing a given virtual partition, a session data record (SDR), also referred to as a session detail record (SDR) throughout this specification, uniquely associated with that given virtual partition. These and other embodiments are described in more detail herein.

DETAILED DESCRIPTION

The session-capacity resources of a Session-over-Internet-Protocol (SoIP) Session Controller (SC) can be subdivided by defining multiple mutually exclusive virtual partitions of session capacity within the SC. Such partitioning supports a business model in which a SC manufacturer sells a SC capable of being partitioned by a first customer that, in turn, defines multiple virtual partitions within the SC and resells the virtual partitions to various partition customers. Each partition customer can be a separate business such as a SoIP carrier, and each partition customer can have exclusive access, relative to the remaining partition customers, to the configuration of its virtual partition and to SoIP-session-related data associated with its virtual partition. Service agreements between partition customers can enable SoIP sessions between different mutually exclusive virtual partitions. A separate session data record (SDR) can be generated in the SC for each virtual partition that participates in an interpartition SoIP session, allowing for billing by and/or apportioned reimbursement of the associated partition customers. The multiple SDRs generated for an interpartition SoIP session can be sent, upon termination of the SoIP session, to a suitable destination in the SoIP network for processing.

Figure 1:
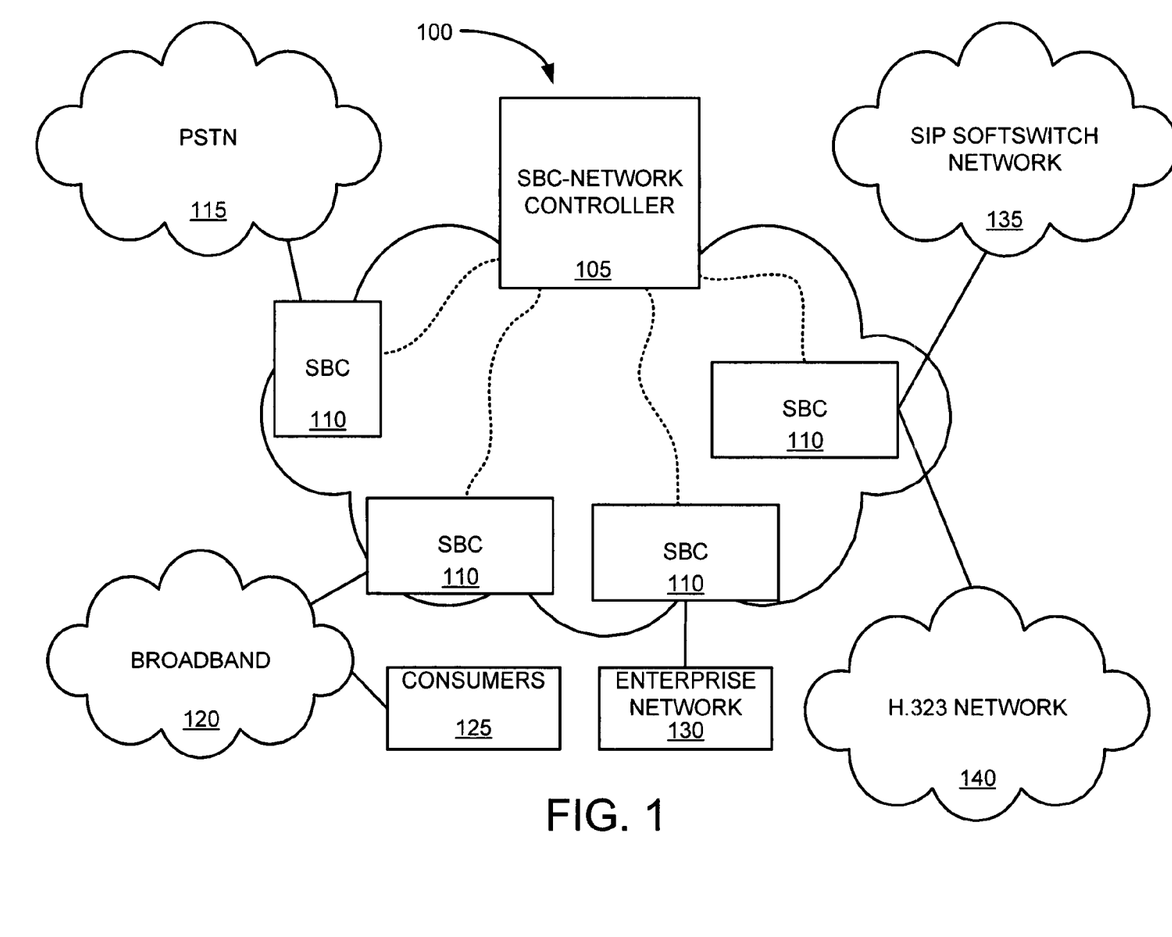
FIG. 1 is a block diagram of a Session-over-Internet-Protocol (SoIP) network, in accordance with an illustrative embodiment of the invention.

Referring now to the drawings, where like or similar elements are designated with identical reference numerals throughout the several views, FIG. 1 is a block diagram of a Session-over-Internet-Protocol (SoIP) network 100, in accordance with an illustrative embodiment of the invention. "Session" refers herein to any packetized transaction traversing SoIP network 100. For example, a Voice-over-Internet-Protocol (VoIP) call is one type of SoIP session. SoIP network 100 includes Session-Border-Controller-network controller (SBC-network controller) 105. SBC-network controller 105 is a centralized device that performs management functions within SoIP network 100 by which SoIP network 100 may be controlled, configured, and coordinated. For example, SBC-network controller 105 may include a user interface for configuring one or more SBCs 110. Also, session data records (SDRs) produced by SBCs 110 can be sent to SBC-network controller 105 upon termination of their associated SoIP sessions. Because not all Session Controllers (SCs) in SoIP network 100 may be at the borders of the network, SBC-network controller 105 may, in such contexts, be termed a SC-network controller. Though SBC-network controller 105 is centralized in the illustrative embodiment of FIG. 1, its functionality may, in other embodiments of the invention, be distributed throughout SoIP network 100. For example, the functionality of SBC-network controller 105 can reside in SBCs 110.

In FIG. 1, one or more SBCs 110 are in communication with SBC-network controller 105 and with network destinations such as Public Switched Telephone Network (PSTN) 115, broadband network 120, consumer premises 125, enterprise network 130, Session Initiation Protocol (SIP) softswitch network 135, and H.323 network 140. SBCs 110 control SoIP sessions between networks (e.g., between SIP softswitch network 135 and H.323 network 140). In some cases, multiple SBCs may be interconnected in a single SoIP session (e.g., a SoIP session between broadband network 120 and PSTN 115). A network destination can also be an individual phone/computer terminal (not shown) or an access point to another SoIP network (not shown). Each of the network destinations is an endpoint from the perspective of the individual SBC 110 that is connected to that network destination.

Figure 2:
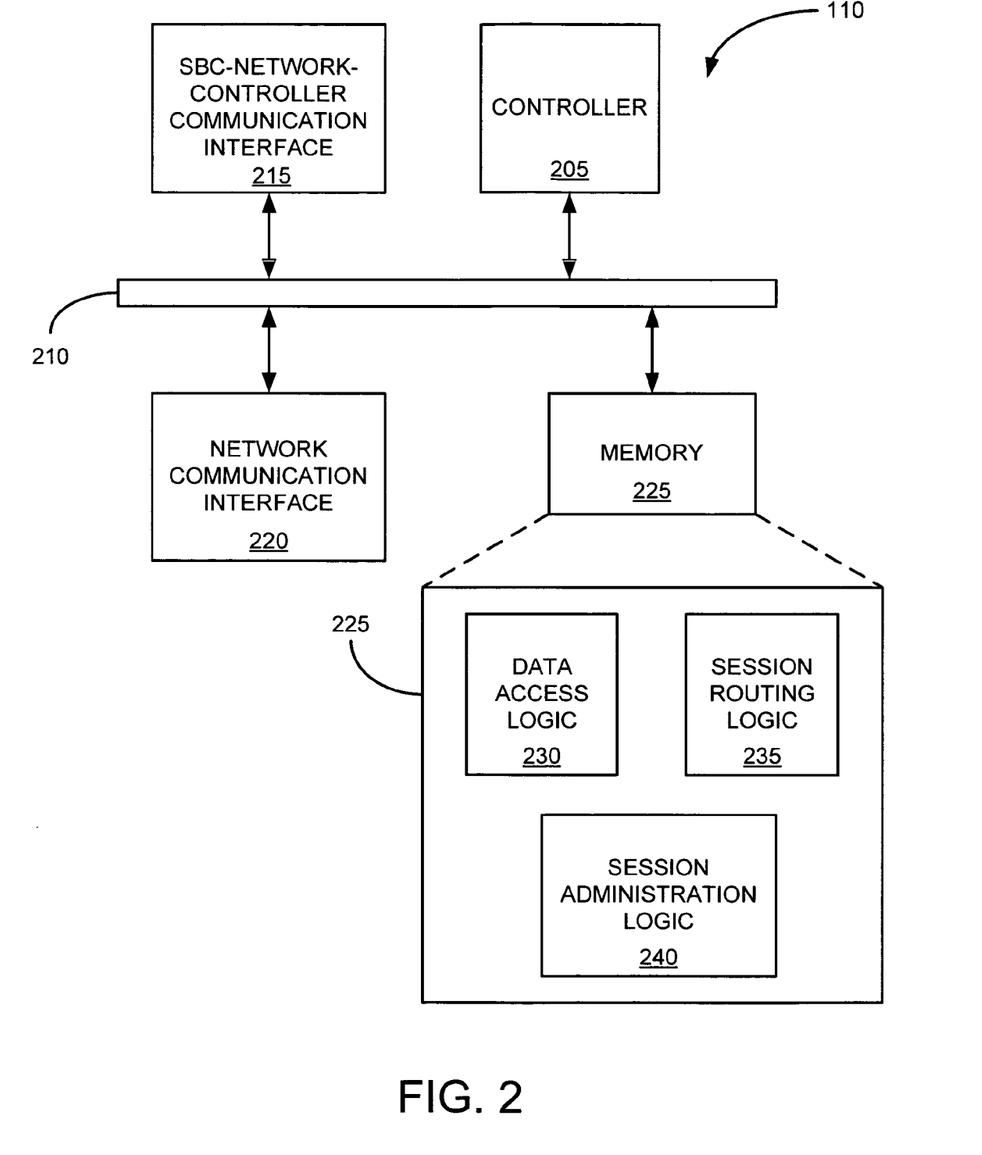
FIG. 2 is a high-level functional block diagram of a Session Border Controller (SBC), in accordance with an illustrative embodiment of the invention.

FIG. 2 is a high-level functional block diagram of a Session Border Controller (SBC) 110, in accordance with an illustrative embodiment of the invention. SBC 110 has an associated block of SoIP session capacity. Though, in the illustrative embodiment of FIG. 2, SBC 110 is presumed to be at the border of SoIP network 100, this embodiment is also applicable to SCs not at the border of SoIP network 100. In FIG. 2, controller 205 communicates over data bus 210 with SBC-network-controller communication interface 215, network communication interface 220, and memory 225.

Controller 205 in FIG. 2 is shown as a single block for simplicity. In one illustrative embodiment, the functionality of controller 205 is divided into signaling and media portions. The signaling portion can, in turn, be divided into a session processor and a media flow controller. The media portion can, in turn, be divided into a packet controller and a packet filter. In this particular embodiment, the hardware and middleware of SBC 110 can be purchased off the shelf, and software can be developed to add additional functionality to SBC 110.

SBC-network-controller communication interface 215 provides a communication interface between SBC 110 and SBC-network controller 105. Network communication interface 220 provides a communication interface between SBC 110 and network destinations such as those shown in FIG. 1.

Memory 225 may be any type of system capable of storing programs and data. Memory 225 may include, for example, random-access memory (RAM), read-only memory (ROM), optical or magnetic disk drives, or any combination thereof. In the illustrative embodiment of FIG. 2, memory 225 contains data access logic 230, session routing logic 235, and session administration logic 240 as program instructions executable by controller 205. For example, data access logic 230, session routing logic 235, and session administration logic 240 can reside in firmware. In general, however, the functionality of these three modules may be implemented in software, firmware, hardware, or any combination thereof.

Data access logic 230 is configured to receive an instruction defining at least one virtual partition, within SBC 110, of the block of SoIP session capacity associated with SBC 110. In an illustrative embodiment, the instruction defining the at least one virtual partition is received from SBC-network controller 105. In another embodiment, SBC 110 includes its own user interface for inputting such an instruction. In the illustrative embodiment of FIG. 2, a manufacturer of SBC 110 sells SBC 110 to a first customer. The first customer, via a user interface of SBC-network controller or another user interface that communicates with data access logic 230, can define one or more virtual partitions within SBC 110. The first customer may also be termed a "primary entity", an "SC management entity", or an "SBC management entity". The first customer can subsequently resell the virtual partitions to various "partition customers". A partition customer can be, for example, a SoIP carrier. Such a SoIP carrier can employ a virtual partition in providing SoIP service to end customers. A partition customer can also be termed a "secondary entity" or a "partition management entity".

In the illustrative embodiment of FIG. 2, data access logic 230 is also configured to grant a primary entity (the first customer) exclusive access to define virtual partitions within SBC 110 and to grant the primary entity access to data associated with each virtual partition. For example, the first customer can use a user interface of SBC-network controller 105 to view such data. Data access logic 230 is also configured to grant each secondary entity (partition customer) exclusive access, relative to the remaining partition customers, to data associated with its virtual partition. In this context, "data" includes, without limitation, (1) configuration data such as source and destination endpoints and their associated logical addresses, and (2) SoIP-session-related data such as SDRs. This provision for exclusive data access among partition customers supports a business model in which each partition customer is a separate business with its own secure, private data. Under this business model, partition customers do not have access to one another's SDRs and configuration data because they are separate businesses.

Data access logic 230 can also be configured to define, within SBC 110, an administrative realm associated with the primary entity (first customer). The administrative realm acts as an intermediary between virtual partitions to enable SoIP sessions between different virtual partitions ("interpartition sessions"). For example, the administrative realm can act as an intermediary between the virtual partitions within SBC 110 and an external route server.

Session administration logic 240 is configured to generate, for each SoIP session traversing a given virtual partition, whether the SoIP session is intrapartition or interpartition, a SDR that is uniquely associated with that given virtual partition. In conjunction with the exclusive data access among partition customers just described, generating SDRs that are mapped to their respective associated virtual partitions supports a business model in which each partition customer is a separate business entity that has its respective usage of SBC 110 separately tracked. For example, each partition customer can easily bill its end customers using its exclusive access, among the partition customers, to SDRs associated with its virtual partition. Each SDR can contain, for example, a source identification, a destination identification, a session duration indicator, and a quality-of-service indicator. In one illustrative embodiment, each SDR can contain multiple quality-of-service indicators.

SBC 110 can also include session routing logic 235. Session routing logic 235 can be configured to receive SoIP session-routing information for each virtual partition within SBC 110. In an illustrative embodiment, the SoIP session-routing information includes a set of source endpoints and a set of destination endpoints, each endpoint from the set of source endpoints and the set of destination endpoints being associated with a logical address (Internet-Protocol address) that is mutually exclusive from a logical address for each remaining endpoint from the set of source endpoints and the set of destination endpoints. Thus, the virtual partitions within SBC 110 are mutually exclusive in this illustrative embodiment. Each endpoint associated with SBC 110 is also associated with a realm. Realms are explained in a later portion of this detailed description. Though a given physical endpoint may be associated with more than one virtual partition, it has a distinct logical address within each virtual partition. This allows session administration logic 240 to track separately the respective endpoints for each virtual partition. This also allows the partition customers to maintain anonymity among themselves and their business partners that own/control the endpoints. For example, when two partition customers share a physical endpoint, neither the two partition customers nor the endpoint operator will be aware of the commonality. In other embodiments, the functionality of session routing logic 235 can be implemented in a device separate from SBC 110, such as a route server.

Figure 3A:
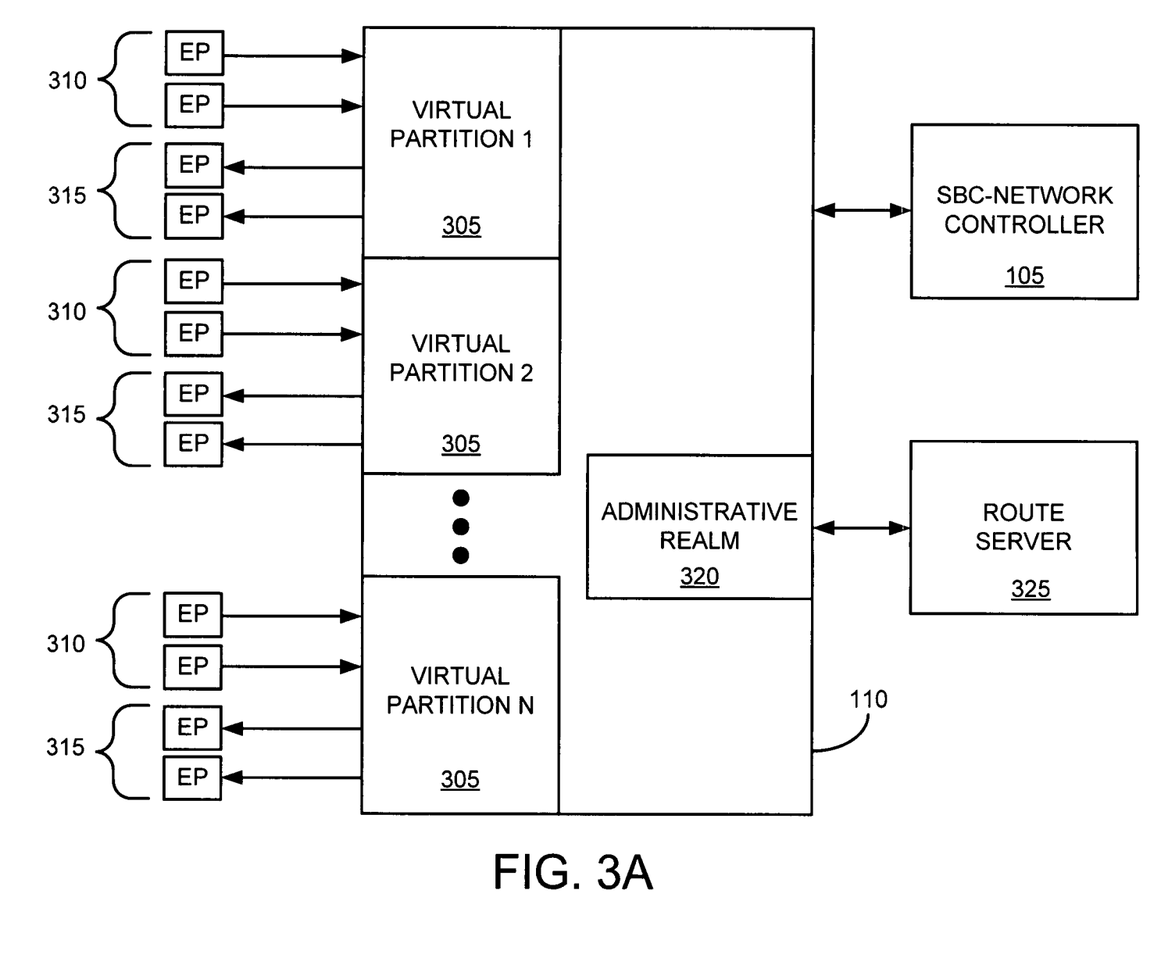
FIG. 3A is a functional diagram of a SBC showing a plurality of mutually exclusive virtual partitions within the SBC, in accordance with an illustrative embodiment of the invention.

FIG. 3A is a functional diagram of SBC 110 showing multiple mutually exclusive virtual partitions 305 within SBC 110, in accordance with an illustrative embodiment of the invention. Virtual partitions 305 are called "virtual" partitions because they are not constrained by the boundaries of the underlying hardware. That is, a single virtual partition 305 can span multiple physical cards or ports in SBC 110. Similarly, a single physical card or port can share multiple virtual partitions 305. In FIG. 3A, the primary entity (first customer) has partitioned the SoIP session capacity of SBC 110 into N mutually exclusive virtual partitions 305 via a user interface (not shown) of SBC-network controller 105 or other suitable user interface. The first customer can also use a user interface of SBC-network controller 105 or another user interface to define administrative realm 320 within SBC 110.

As explained above, the primary entity can resell the virtual partitions 305 to partition customers (secondary entities).

Each partition customer can then use a user interface of SBC-network controller 105 or another user interface to configure a set of source endpoints 310 and destination endpoints 315 for its virtual partition. For simplicity, only two source endpoints 310 and two destination endpoints 315 are shown for each virtual partition 305 in FIG. 3A. In a practical implementation of SBC 110, each virtual partition 305 can have a large number of associated endpoints.

In the illustrative embodiment of FIG. 3A, route server 325, external to SBC 110, stores routing information to enable interpartition SoIP sessions. In this embodiment, administrative realm 320 acts as an intermediary between virtual partitions 305 and route server 325 in establishing interpartition SoIP sessions. In a different illustrative embodiment, the functionality of the route server is integrated with SBC 110, rendering an external route server unnecessary. In yet another embodiment, all routing information for both intrapartition (within a single virtual partition) and interpartition SoIP sessions resides in route server 325. In this latter embodiment, administrative realm 320 acts as an intermediary between virtual partitions 305 and route server 325 for both intrapartition and interpartition sessions.

Figure 3B:
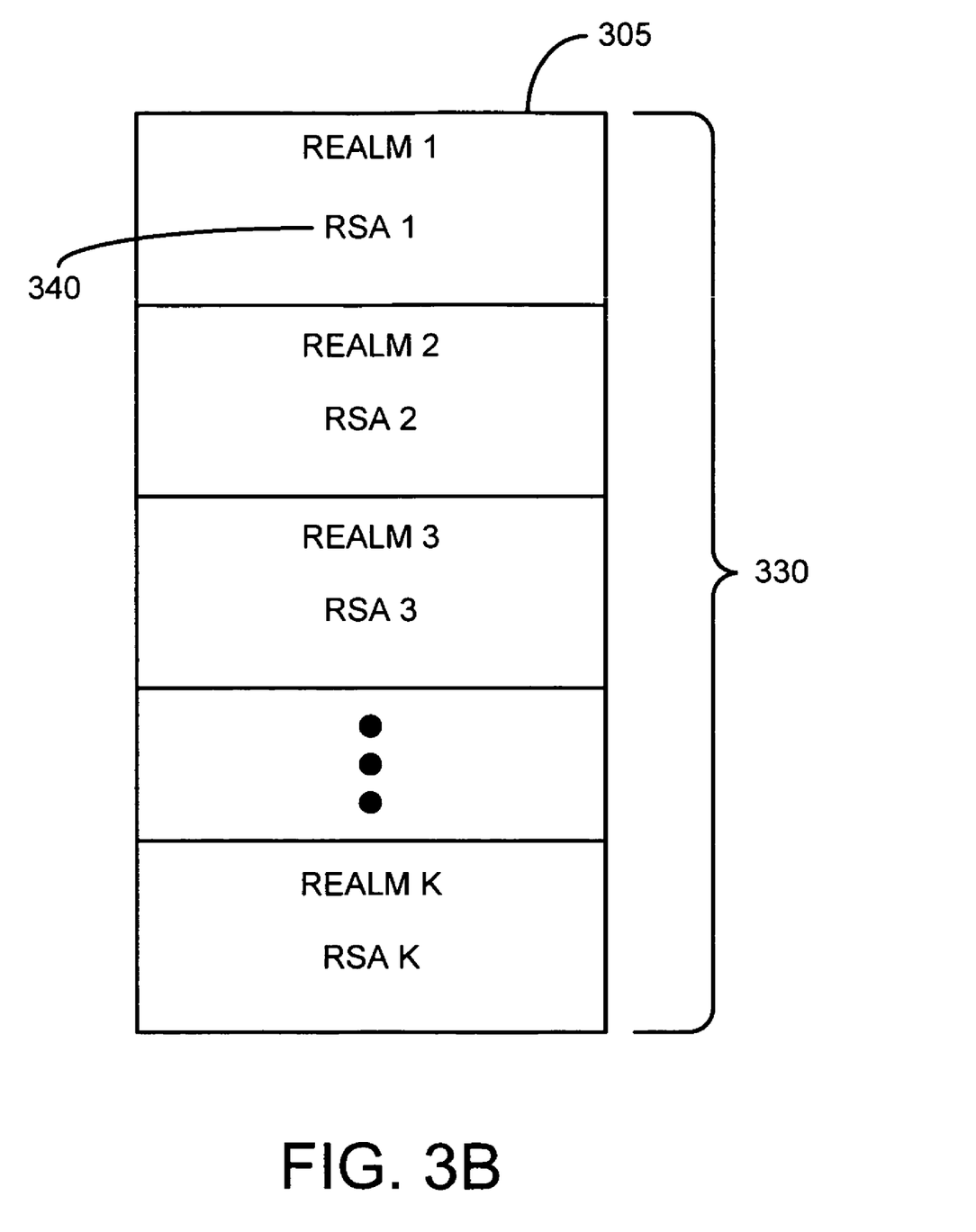
FIG. 3B is a diagram of a virtual partition within a SBC, in accordance with an illustrative embodiment of the invention.

FIG. 3B is a diagram of a virtual partition 305 within SBC 110, in accordance with an illustrative embodiment of the invention. As illustrated in FIG. 3B, each virtual partition 305 shown in FIG. 3A is associated with at least one realm 330. Each realm 330 is a logical entity within SBC 110 that is associated with a realm signaling address (RSA) 340. A RSA is a logical Internet-Protocol (IP) address within SBC 110 that is used for communication between SBC 110 and endpoints configured within the associated realm 330. In FIG. 3B, virtual partition 305 is associated with K realms 330, illustrating the general case. In a different illustrative embodiment, each virtual partition 305 is associated with a single realm 330 (i.e., K=1).

Figure 4:
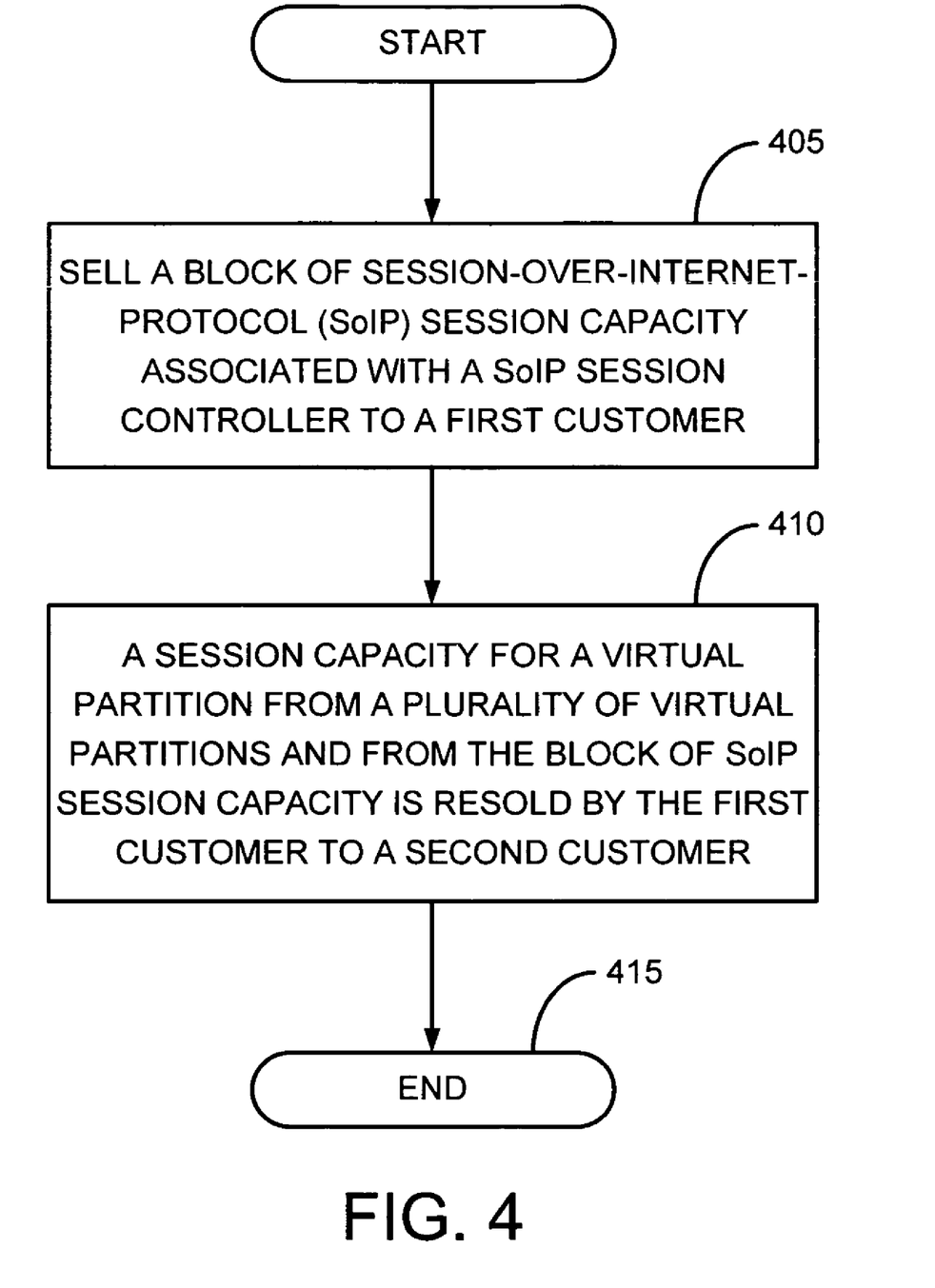
FIG. 4 is a flowchart of a method for partitioning and reselling session-capacity resources in a SBC, in accordance with an illustrative embodiment of the invention.

FIG. 4 is a flowchart of a method for partitioning and reselling session-capacity resources in a SBC 110, in accordance with an illustrative embodiment of the invention. At 405, a block of SoIP session capacity associated with a SoIP SC (or SBC 110) is sold to a first customer. For example, a manufacturer of SoIP network equipment can sell a SBC 110 to the first customer. At 410, the session capacity of a virtual partition 305 from the N mutually exclusive virtual partitions 305 shown in FIG. 3A can be resold by the first customer to a partition customer. In the illustrative embodiment of FIG. 4, each partition customer is uniquely associated with a virtual partition 305 from the N mutually exclusive virtual partitions 305 shown in FIG. 3A. At 415, the process terminates.

Figure 5A:
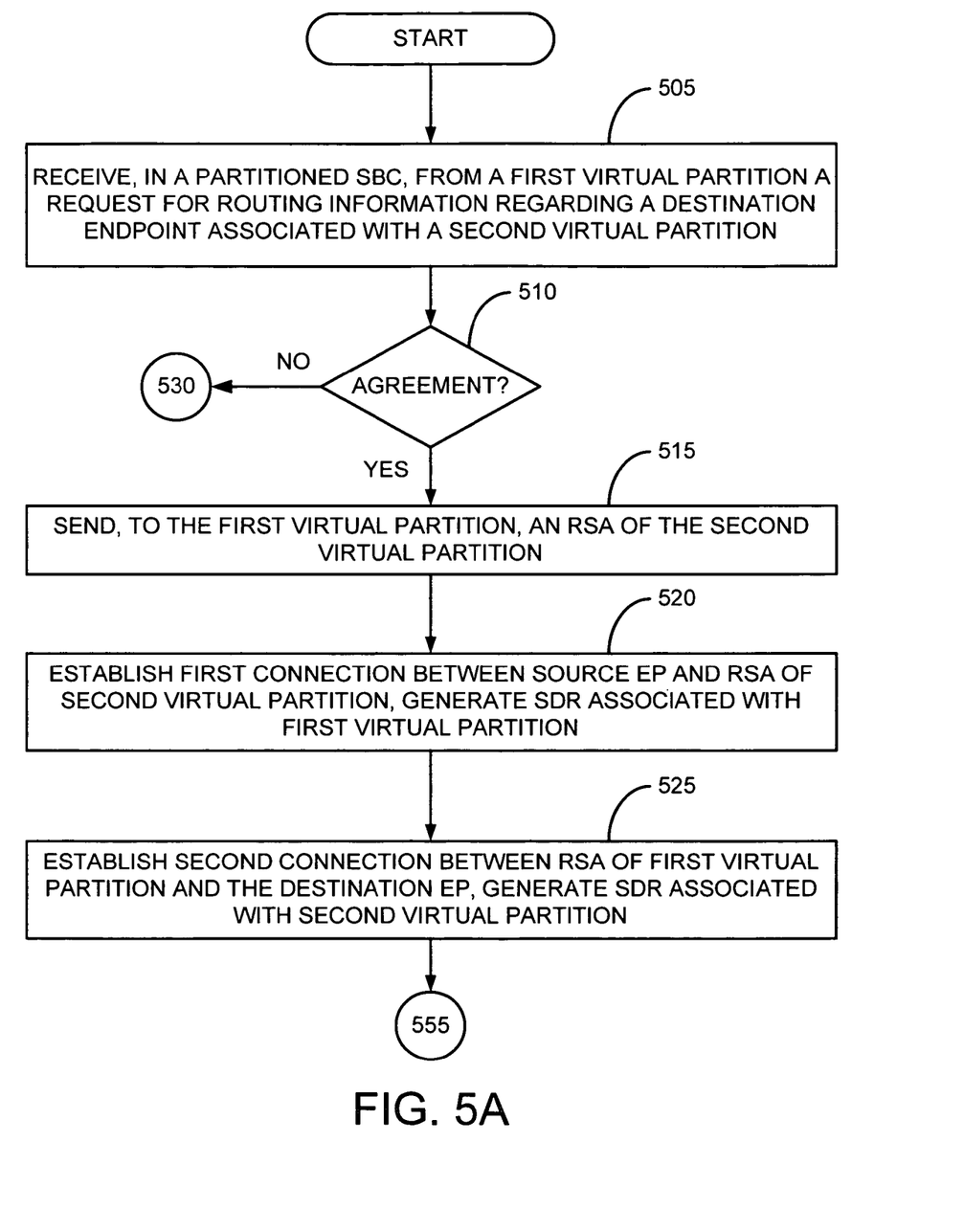
FIGS. 5A-5C are a flowchart of a method for handling interpartition SoIP sessions, in accordance with an illustrative embodiment of the invention.
Figure 5B:
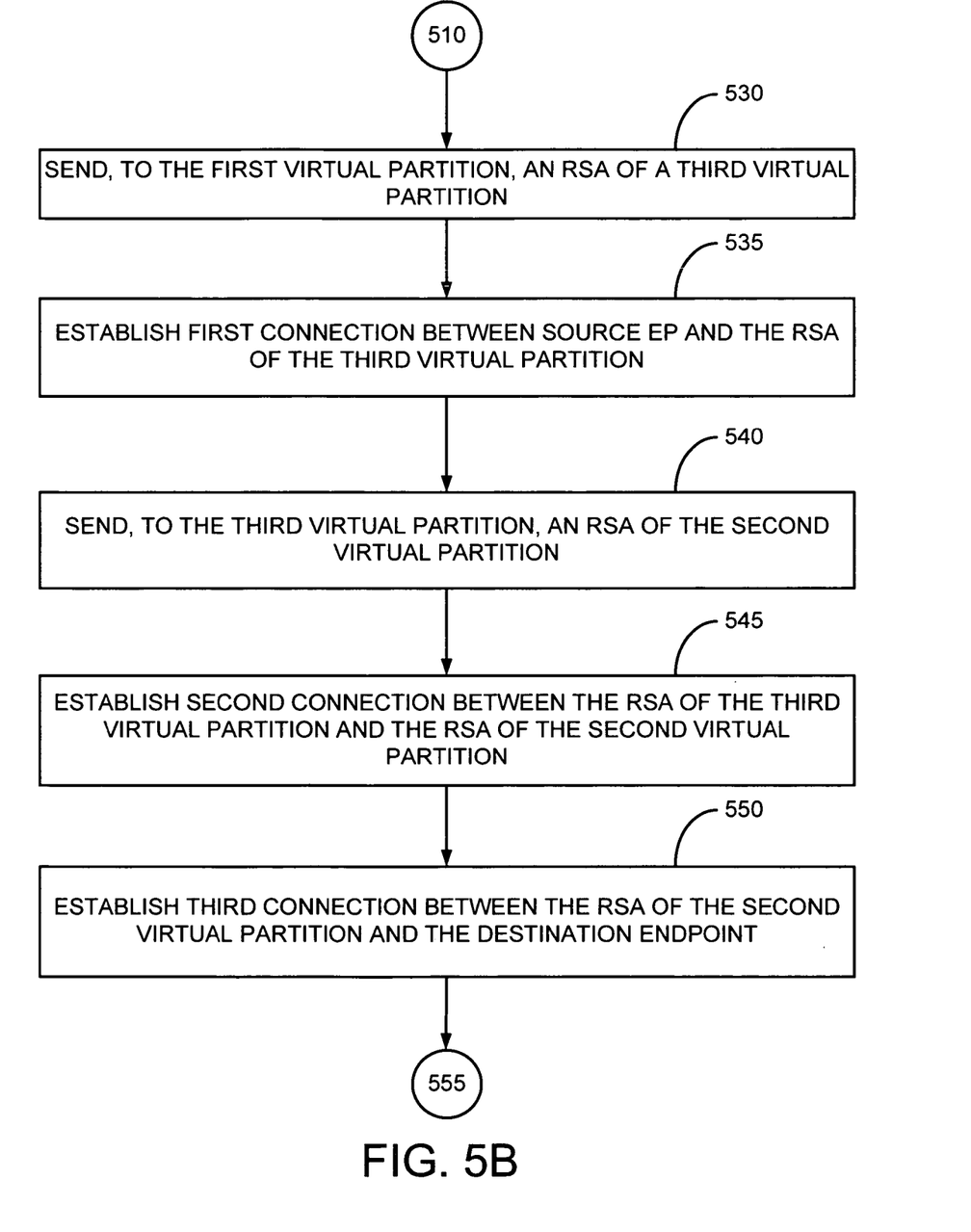
Figure 5C:
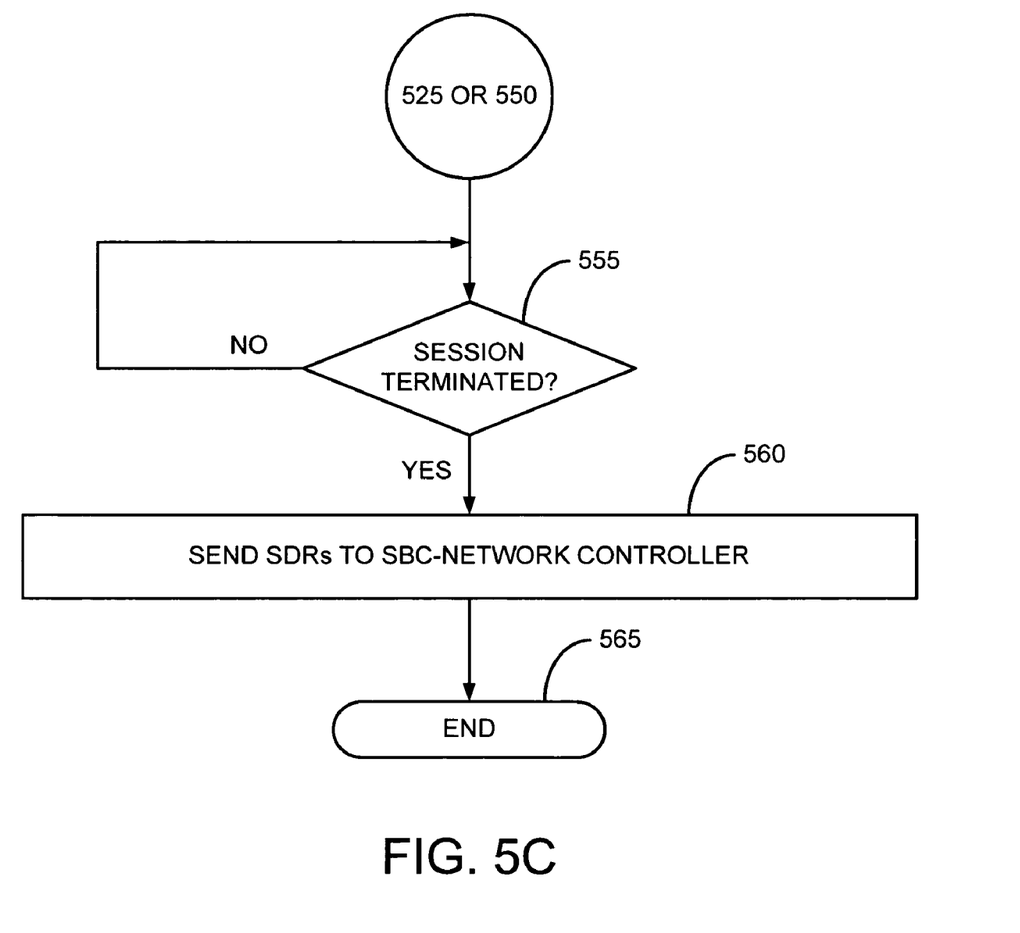

FIGS. 5A-5C are a flowchart of a method for handling interpartition SoIP sessions, in accordance with an illustrative embodiment of the invention. The method shown in FIGS. 5A-5C is associated with the handling of interpartition SoIP sessions within partitioned SBC 110. Such a method that enables interpartition SoIP sessions can be termed "realm hopping" or "partition hopping." Referring first to FIG. 5A, at 505, administrative realm 320 receives, from a first virtual partition 305 (e.g., "VIRTUAL PARTITION 1" in FIG. 3A), a request for routing information concerning a destination endpoint 315 associated with a second virtual partition 305 (e.g., "VIRTUAL PARTITION 2" in FIG. 3A). If, at 510, administrative realm 320 determines that a service agreement exists between the respective partition customers associated with the first and second virtual partitions 305, the process proceeds to 515. At 515, administrative realm 320 sends to the first virtual partition 305 the RSA 340 of the second virtual partition 305. In an illustrative embodiment, administrative realm 320 consults route server 325 to determine whether a service agreement exists between the respective partition customers. In other embodiments, such information can reside in SBC 110 itself.

At 520, a first connection is established between the source endpoint 310 in the first virtual partition 305 and the RSA 340 of the second virtual partition. Upon establishment of the SoIP session, session administration logic 240 can also initiate a SDR that is associated with the first virtual partition 305 so that the partition customer associated with the first virtual partition 305 can, for example, bill its end customer and/or seek apportioned reimbursement from the destination network or the called party. At 525, a second connection is established between the RSA of the first virtual partition and destination endpoint 315 in the second virtual partition 305. Upon establishment of the SoIP session, session administration logic 240 can initiate an additional SDR that is associated with the second virtual partition 305 so that the partition customer associated with the second virtual partition 305 can bill its end customer and/or seek apportioned reimbursement from the destination network or the called party. The first and second connections, in tandem, define the SoIP session between source endpoint 310 in the first virtual partition 305 and destination endpoint 315 in the second virtual partition 305. Thus, when this SoIP session is established, two separate SDRs are established, one for each partition customer and associated with that portion of the SoIP session for that partition customer.

If, at 510, no service agreement is found to exist between the respective partition customers associated with the first and second virtual partitions 305, the process proceeds to step 530 in FIG. 5B. Referring to FIG. 5B, at 530, administrative realm 320 determines that a service agreement exists between the partition customer associated with the first virtual partition 305 and that associated with the third virtual partition 305 and that a service agreement exists between the partition customer associated with a third virtual partition 305 and that associated with the second virtual partition 305. In such a situation, these service agreements can mitigate the lack of a service agreement directly between the partition customers associated with the first and second virtual partitions 305. At 530, administrative realm 320 sends, to the first virtual partition 305, the RSA 340 of the third virtual partition. At 535, a first connection is established between source endpoint 310 and the RSA 340 of the third virtual partition 305.

At 540, administrative realm 320 sends, to the third virtual partition 305, the RSA 340 of the second virtual partition. At 545, a second connection is established between the RSA 340 of the third virtual partition 305 and the RSA 340 of the second virtual partition. At 550, a third connection is established between the RSA 340 of the second virtual partition 305 and the destination endpoint 315 associated with the second virtual partition 305. The first, second, and third connections, in tandem, define a SoIP session.

In general, session administration logic 240 can generate a separate SDR for each virtual partition 305 that participates in an interpartition SoIP session. In the illustrative embodiment shown in FIG. 5B, session administration logic 240 generates a SDR for the partition customer associated with each of the first, second, and third virtual partitions 305 for a total of three separate SDRs. These techniques may be extended to a SoIP session involving J connections in tandem and, correspondingly, J separate SDRs. Such connections can involve two or more virtual partitions 305 within a given SBC 110.

At the completion of step 525 or 550, at which point a SoIP session has been established, the process proceeds to step 555 in FIG. 5C. Referring to FIG. 5C, upon termination of the SoIP session for whatever reason at 555 (e.g., termination by calling party, termination by called party, or failure of session setup), SBC 110 sends any SDRs associated with the SoIP session to SBC-network controller 105 at 560. At 565, the process terminates.

Figure 6:
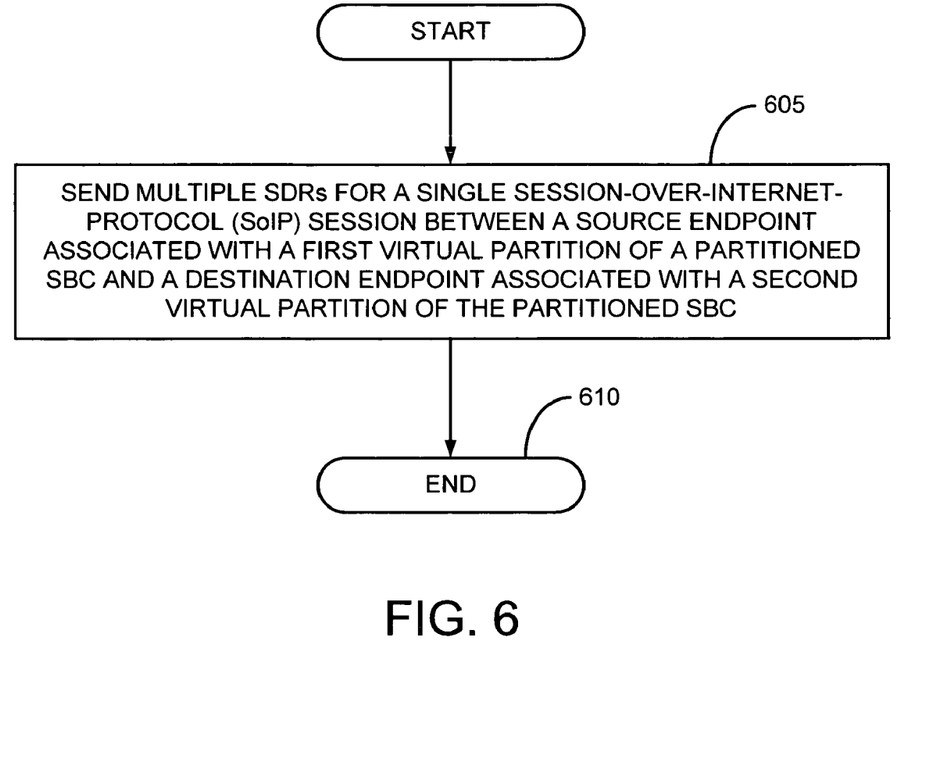
FIG. 6 is a flowchart of a method for sending multiple session data records (SDRs) for a single SoIP session, in accordance with an illustrative embodiment of the invention.

FIG. 6 is a flowchart of a method for sending multiple session data records (SDRs) for a single SoIP session, in accordance with an illustrative embodiment of the invention. The method shown in FIG. 6 relates to the generation of multiple SDRs in connection with a single SoIP session between the same two endpoints. That session administration logic 240 can generate multiple SDRs (one for each participating virtual partition 305) for a single interpartition SoIP session was explained above in connection with the discussion of FIGS. 5A-5C. At 605, the multiple SDRs associated with a single interpartition SoIP session are sent to an appropriate destination in SoIP network 100 for processing. In an illustrative embodiment, the plurality of SDRs are sent, upon termination of the SoIP session, to SBC-network controller 105 (see steps 555 and 560 in FIG. 5C). At 610, the process terminates.

In conclusion, among other things, a method and apparatus for partitioning resources within a SoIP SC are described. Although such partitioning is described above in reference to certain embodiments, many variations are possible. For example, exclusive access of each partition customer, relative to the remaining partition customers, to data associated with its virtual partition can include exclusive access to the configuration of user-defined alarms (alarm services) associated with that partition customer's virtual partition 305. Alarm services are discussed more fully in U.S. patent application Ser. No. 11/343,212, "Adaptive Feedback for Session Over Internet Protocol"; and U.S. patent application Ser. No. 11/343,212, "Session Data Records and Related Alarming within a Session Over Internet Protocol (SoIP) Network," each of which is incorporated herein by reference.

What is claimed is:

1. A method, comprising:

receiving, in a partitioned Session Border Controller (SBC), from a first virtual partition of the SBC, a request for routing information regarding a destination endpoint associated with a second virtual partition of the SBC, wherein the first and second virtual partitions are associated with at least one realm and wherein the first and second virtual partitions are partitions of resources of the SBC; and performing the following, when a service agreement exists between a first partition management entity associated with the first virtual partition and a second partition management entity associated with the second virtual partition:

sending, to the first virtual partition, a realm signaling address (RSA) of the second virtual partition;

establishing a first connection between a source endpoint associated with the first virtual partition and the RSA of the second virtual partition;

generating a session detail record (SDR) uniquely associated with the first virtual partition such that usage of the SBC resources are separately trackable for the first virtual partition and the first partition management entity;

establishing a second connection between an RSA of the first virtual partition and the destination endpoint associated with the second virtual partition; and generating a session detail record (SDR) uniquely associated with the second virtual partition such that usage of the SBC resources are separately trackable for the second virtual partition and the second partition management entity;

wherein a SoIP session is defined by the first and second connections in tandem, wherein the RSA includes a logical Internet Protocol (IP) address within the SBC that is associated with a realm and used for communicating between the partitioned SBC and endpoints configured within the associated realm, and wherein the SDR includes a source ID, a destination ID, a session duration indicator, and at least one quality-of-service (QoS) indicator.

2. The method of claim 1, wherein the request from the first virtual partition is received by an administrative realm within the SBC, the administrative realm being associated with an SBC management entity.

3. The method of claim 1, further comprising sending the SDR associated with the first virtual partition and the SDR associated with the second virtual partition to a Session Controller (SC)-network controller upon termination of the SoIP session.

4. The method of claim 1, further comprising performing the following, when no service agreement exists between the first and second partition management entities:

sending, to the first virtual partition, an (RSA) of a third virtual partition;

establishing a first connection between a source endpoint associated with the first virtual partition and the RSA of the third virtual partition;

sending, to the third virtual partition, an RSA of the second virtual partition;

establishing a second connection between the RSA of the third virtual partition and the RSA of the second virtual partition; and establishing a third connection between the RSA of the second virtual partition and the destination endpoint.

5. An apparatus, comprising:

at least one processor;

data access logic configured to:

receive instructions to define a plurality of virtual partitions in a Session-over-Internet-Protocol (SoIP) Session Border Controller (SBC), wherein each virtual partition is a partition of resources of the SBC, and wherein each virtual partition is associated with at least one realm, each realm being associated with a logical internet protocol (IP) address;

grant a primary entity access to data associated with each virtual partition, wherein the primary entity comprises an SBC management entity that resells use of the virtual partitions to secondary entities such that the secondary entities comprise partition customers; and grant each secondary entity from a plurality of secondary entities exclusive access, relative to the remaining secondary entities from the plurality of secondary entities, to data associated with a virtual partition associated with that secondary entity; and session administration logic configured to generate, for each SoIP session traversing a given virtual partition, a session detail record (SDR) uniquely associated with that given virtual partition such that usage of the SBC resources are separately trackable for each virtual partition and virtual partition customer, wherein each SDR includes a source identifier (ID), a destination (ID), a session duration indicator, and at least one quality-of-service (QoS) indicator.

6. The apparatus of claim 5, further comprising:

session routing logic configured to receive, for each virtual partition, SoIP session-routing information including a set of source endpoints and a set of destination endpoints, each endpoint from the set of source endpoints and the set of destination endpoints being associated with a logical address mutually exclusive from a logical address for each remaining endpoint from the set of source endpoints and the set of destination endpoints.

7. The apparatus of claim 5, wherein the data access logic is configured to receive the instruction from an SBC-network controller.

8. The apparatus of claim 5, wherein SoIP session-routing information associated with routing interpartition SoIP sessions resides in a route server that is external to the SoIP SBC.

9. The apparatus of claim 5, wherein SoIP session-routing information associated with routing intrapartition and interpartition SoIP sessions resides in a route server that is external to the SoIP SBC.

10. The apparatus of claim 5, wherein the data access logic is further configured to define an administrative realm associated with the primary entity, the administrative realm acting as an intermediary between the at least one virtual partition and an external route server associated with interpartition SoIP sessions.

11. The apparatus of claim 4, wherein each virtual partition is associated with a single realm.

12. A method, comprising:

establishing a single Session-over-Internet-Protocol (SoIP) session between a source endpoint associated with a first virtual partition of a partitioned Session Border Controller (SBC) and a destination endpoint associated with a second virtual partition of the partitioned SBC, wherein each virtual partition is a partition of SBC resources and wherein at least some of the virtual partitions are assigned to different partition customers; and generating a plurality of session detail records (SDRs) for the single SoIP session, wherein each SDR from the plurality of SDRs is associated with a different virtual partition that participates in establishing the single SoIP session such that the SDRs are usable to track usage of SBC resources on a per-partition-customer basis, wherein each SDR includes a source identifier (ID), a destination ID, a session duration indicator, and at least one quality-of-service (QoS) indicator.

13. The method of claim 12, wherein the plurality of SDRs are sent to an SBC-network controller upon termination of the single SoIP session.

14. The method of claim 12, wherein the plurality of SDRs are initiated upon establishment of the single SoIP session.

* * * * *